(12) United States Patent
Wu et al.

(10) Patent No.: US 12,266,321 B2
(45) Date of Patent: Apr. 1, 2025

(54) CHOLESTERIC LIQUID CRYSTAL DISPLAY AND DRIVING METHOD THEREOF

(71) Applicant: IRIS OPTRONICS CO., LTD., Tainan (TW)

(72) Inventors: Chia-Che Wu, Tainan (TW); Wu-Chang Yang, Tainan (TW); Chi-Chang Liao, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 18/220,804

(22) Filed: Jul. 11, 2023

(65) Prior Publication Data

US 2024/0013743 A1    Jan. 11, 2024

(30) Foreign Application Priority Data

Jul. 11, 2022    (TW) .................................. 111125860

(51) Int. Cl.
*G09G 3/36*    (2006.01)
*G02F 1/133*    (2006.01)
*G02F 1/1345*    (2006.01)

(52) U.S. Cl.
CPC ........ *G09G 3/3611* (2013.01); *G02F 1/13306* (2013.01); *G02F 1/13452* (2013.01); *G09G 2310/0202* (2013.01); *G09G 2310/08* (2013.01); *G09G 2320/0209* (2013.01); *G09G 2320/0242* (2013.01)

(58) Field of Classification Search
CPC ......... G09G 3/3611; G09G 2310/0202; G09G 2310/08; G09G 2320/0209; G09G 2320/0242; G09G 5/10; G09G 5/00; G09G 3/36; G09G 3/20; G09G 3/32; G02F 1/13306; G02F 1/134452; G02F 1/133; G02F 1/1345
See application file for complete search history.

(56) References Cited

U.S. PATENT DOCUMENTS

| | | | |
|---|---|---|---|
| 2001/0024188 A1* | 9/2001 | Masazumi ........... | G09G 3/3629 345/98 |
| 2010/0295875 A1 | 11/2010 | Huang et al. | |
| 2013/0016131 A1 | 1/2013 | Chen et al. | |
| 2021/0090513 A1* | 3/2021 | Takahashi ............ | G09G 3/3677 |

FOREIGN PATENT DOCUMENTS

| | | |
|---|---|---|
| CN | 108962109 A | 12/2018 |
| TW | 201211989 A1 | 3/2012 |

\* cited by examiner

*Primary Examiner* — Michael A Faragalla
(74) *Attorney, Agent, or Firm* — Cheng-Ju Chiang

(57) ABSTRACT

A cholesteric liquid crystal (ChLC) display and driving method thereof are provided. The ChLC display has a driving circuit for providing voltage on a scan line and a data line so as to drive a pixel. The driving circuit provides a first voltage and a second voltage to the data and the scan lines during a first time period, a third voltage to the data line and/or a fourth voltage to the scan line during a second time period, a fifth voltage and a sixth voltage to the data and the scan lines during a third time period. The first and sixth voltages are high levels, the second and fifth voltages are low levels, the levels of the third and fourth voltages are between the high and low levels.

6 Claims, 4 Drawing Sheets

401 — A first voltage and a second voltage are applied to the scan line and the data line, respectively, during the first time period.

402 — A third voltage and a fourth voltage are applied to the scan line and the data line, respectively, during the second time period.

403 — A fifth voltage and a sixth voltage are applied to the scan line and the data line, respectively, during the third time period. The first voltage and the second voltage are set to a high level, while the sixth voltage and the fifth voltage are set to a low level. The levels of the third voltage and the fourth voltage are set between the high level and the low level.

Fig. 4

CHOLESTERIC LIQUID CRYSTAL DISPLAY AND DRIVING METHOD THEREOF

BACKGROUND OF THE INVENTION

1. Field of the Invention

The present invention relates to a display technology, and in particular, to a cholesteric liquid crystal display and a driving method thereof.

2. Description of Related Art

A cholesteric liquid crystal display is widely known to be composed of multiple scan lines (rows) and multiple data lines (columns) intersected to form a passive matrix. Each pixel is formed by the intersection of one scan line and one data line. The pixel produces different gray scales by undergoing different liquid crystal transitions based on the voltage difference provided by the corresponding scan line and data line. Conventionally, the driving circuit of a cholesteric liquid crystal display applies voltages to the scan line and data line to drive the pixels using the voltage difference between them. FIG. 1 illustrates a schematic diagram of the prior art. As shown in FIG. 1, the driving circuit (not shown) applies voltages V1 and V2 to the data line and scan line, respectively, during the first time period t1, and a voltage difference is equal to V1-V2. During the second time period t2, voltages V3 and V4 are applied to the data line and scan line, respectively, and a voltage difference is equal to V3-V4. The pixels are driven by these two voltage differences. For example, please consider the actual voltage values as follows: V1=10V, V2=5V, V3=-10V, V4=-5V.

During the generation of images in a cholesteric liquid crystal display, voltage needs to be applied to each scan line in row-by-row format. However, when applying voltage to the current scan line, issues such as the rapid voltage conversion and the impact of parasitic capacitance can occur. These factors make it susceptible to electrical interference and can potentially damage the previously asserted scan line. As a result, problems such as color shift or cross talk may arise.

Therefore, the present invention provides a cholesteric liquid crystal display and driving method to overcome the aforementioned disadvantages.

SUMMARY OF THE INVENTION

The present invention provides a cholesteric liquid crystal display and a driving method aimed at improving color shift or cross talk resulting from electrical interference. In the column-by-column assertion of scan lines, electrical interference from the currently asserted scan line can affect the scan line of the previous pixel, potentially causing undesirable effects. The present invention addresses this issue and enhances the user experience by mitigating the impact of such interference.

In order to achieve at least one of the aforementioned advantages or other advantages, an embodiment of the present invention provides a driving method for a cholesteric liquid crystal display. The driving method is suitable for a cholesteric liquid crystal display comprising scan lines, data lines, and pixels. The driving method for a cholesteric liquid crystal display comprises the following steps: applying a first voltage to the data line and a second voltage to the scan line in the first time period, respectively; applying a third voltage to the data line and/or a fourth voltage to the scan line in the second time period; and applying a fifth voltage to the data line and a sixth voltage to the scan line in the third time period. The first voltage and the second voltage are set at a high level of voltage, while the sixth voltage and the fifth voltage are set at a low level of voltage. The voltage levels of the third voltage and the fourth voltage are set between the high level of voltage of the first voltage and the second voltage, and the low level of voltage of the sixth voltage and the fifth voltage. The pixels are driven by the voltage difference applied to the scan line and the data line, wherein the voltage difference equals an electric potential difference.

In order to achieve at least one of the aforementioned advantages or other benefits, another embodiment of the present invention provides a cholesteric liquid crystal display comprising a driving circuit, scan lines, data lines, and pixels. The scan line and the data line are electrically connected to the driving circuit, while the pixels are electrically connected to both the scan line and the data line. The driving circuit is responsible for applying different voltages to the data line and the scan line during specific time periods. In the first time period, the driving circuit applies a first voltage to the data line and a second voltage to the scan line. These voltages are set at a high level. In the second time period, the driving circuit applies a third voltage to the data line and/or a fourth voltage to the scan line. These voltages are set between the high level and a low level voltage. In the third time period, the driving circuit applies a fifth voltage to the data line and a sixth voltage to the scan line. These voltages are set at a low level. The pixels are driven by the voltage difference applied to the scan line and the data line.

In some embodiments, the third voltage is substantially equal to the fourth voltage.

In some embodiments, the third voltage is substantially different from the fourth voltage.

In some embodiments, the first time period is substantially equal to the third time period, and the second time period is no more than 20% of the first time period.

Therefore, the present invention provides a cholesteric liquid crystal display and a driving method. In this method, the third voltage is applied to the data line, while the fourth voltage is applied to the scan line. This configuration aims to reduce voltage interference among pixels on the previous scan line. Voltage interference typically arises due to rapid charge conversion when the scan line is sequentially turned on. Additionally, this approach helps mitigate issues such as color shift or cross talk commonly associated with conventional cholesteric liquid crystal displays.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

FIG. 4 is a flowchart of a driving method for a cholesteric liquid crystal display according to an embodiment of the present invention.

DETAILED DESCRIPTION OF THE PREFERRED EMBODIMENTS

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

It should be understood that the term used herein in embodiments to describe direction in terms of "central", "lateral", "up", "down", "right", "left", "upright", "horizontal", "top", "bottom", "inside", and "outside" are used to illustrate the present invention and for clarity. It does not hint or imply that device or part mentioned should be assembled or operated in specific direction or setting. Thus, the terms used herein to describe direction are not limiting. In addition, terms "first", and "second" is for descriptive purpose, and is not construed to or implies amount as described in technical feature of the present invention. Technical features with limitation terms "first" or "second" would illustrate or imply that one or more technical features may be included. As to detailed description of the present invention, the term "more" indicates two or more unless expressly indicated otherwise.

As to detailed descriptions of the present invention, it will be further explained that the term "assemble", "connected to", "connected" should be construed in broadest way, unless the context clearly indicates otherwise. For example, the term "connected" indicates that two parts may be "fixed connected" or "detachably connected" or "integrally connected". Similarly, the term "connected" also indicates that two parts may be "mechanically connected" or "electrically connected", and "directly connected", "connected by intermediate part" or "internally connected by two parts". Alterations or modifications of the terms mentioned above will be no doubt understood and obvious to those of ordinary skill in the art.

The terminology used herein is for the purpose of describing embodiments only and is not intended to limit the full scope of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, or components and the like, but do not preclude the presence or addition of one or more other features, integers, steps, operations, elements, components, and/or groups thereof.

Figure 1:
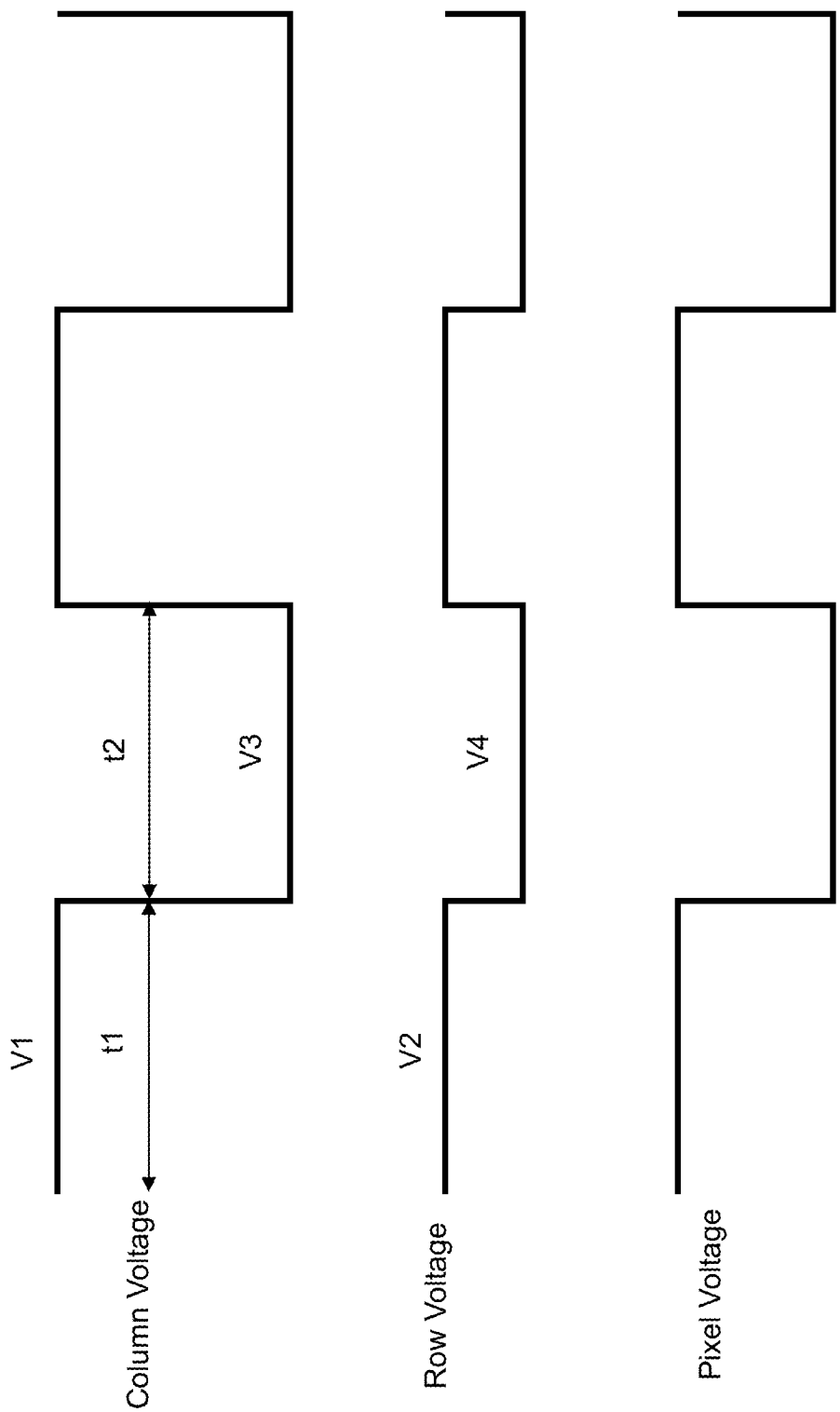
FIG. 1 is a schematic diagram of the prior art.
Figure 2:
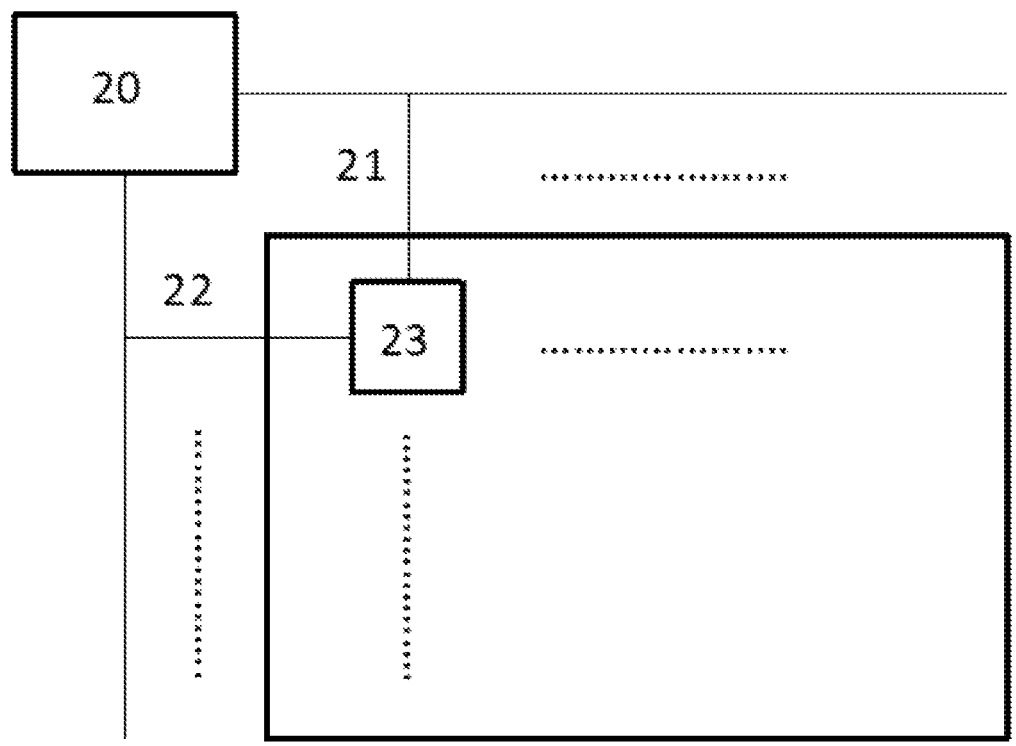
FIG. 2 is a schematic diagram of an embodiment of a cholesteric liquid crystal display device according to the present invention.

FIG. 2 depicts a schematic diagram of an embodiment of a cholesteric liquid crystal display device according to the present invention. As illustrated in FIG. 2, the cholesteric liquid crystal display 200 comprises a driving circuit 20, a scan line 21, a data line 22, and a pixel 23. It is important to note that the cholesteric liquid crystal display 200 shown in FIG. 2 should further comprises multiple scan lines 21, data lines 22, and a greater number of pixels 23 formed at the intersections of scan lines and data lines. In this embodiment, only one of each is depicted to serve as a representative example.

Figure 3:
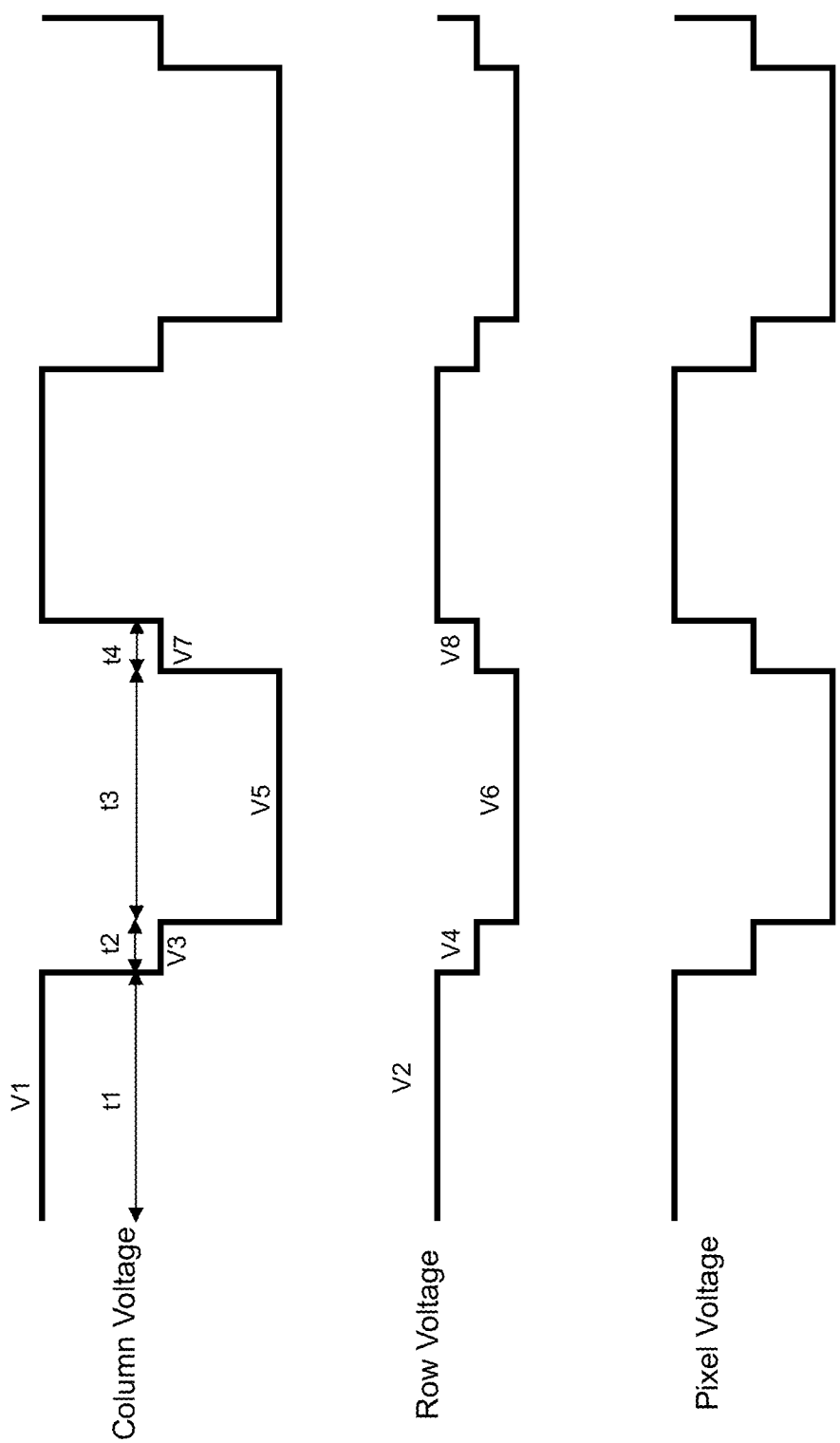
FIG. 3 is a schematic diagram of waveforms of scan lines, data lines and pixels according to an embodiment of the present invention.

FIG. 3 is a schematic diagram illustrating waveforms of scan lines, data lines, and pixels according to an embodiment of the present invention. Please refer to FIGS. 2 and 3. In the first time period t1, the driving circuit 20 applies the first voltage V1 to the data line 21 and the second voltage V2 to the scan line 22. Then, in the second time period t2, the third voltage V3 is applied to the data line 21, and the fourth voltage V4 is applied to the scan line 22. Similarly, in the third time period t3, the fifth voltage V5 is applied to the data line 21, and the sixth voltage V6 is applied to the scan line 22. Specifically, the first voltage V1 and the second voltage V2 are set at a high level, while the sixth voltage V6 and the fifth voltage V5 are set at a low level. The third voltage V3 and the fourth voltage V4 are set between the high level and the low level. For example, V1=10V, V2=5V, V3=V4=0V, V5=−10V, and V6=−5V. In this embodiment, the driving circuit 20 also applies the seventh voltage V7 and the eighth voltage V8 to the data line 21 and the scan line 22, respectively, in a fourth time period t4.

Please refer to FIG. 3 for further details. According to the aforementioned method, the voltage is applied to both the data line 21 and the scan line 22, resulting in the waveform of the corresponding pixel 23 as shown at the bottom of FIG. 3. It may be observed that there is a turning point in the voltage level, transitioning from high level to low level, due to the application of the third voltage V3 to the data line 21 and the fourth voltage V4 to the scan line 22 respectively. This turning point serves as a buffer during the transition from a high voltage level to a low voltage level, reducing voltage interference in the pixels of the imaged area. Although this embodiment has been described in detail, those who skilled in the art understand that either the third voltage V3 or the fourth voltage V4 may be applied to the corresponding data line/scan line at a second time, and the corresponding voltage can also be applied to the data line/scan line during either the second time period t2 or the fourth time period t4. As long as the pixel voltage can change from high level to low level and/or from low level to high level, resulting in a turning point in the voltage level during the transition, the objective of the present invention may be achieved.

It should be noted that in the embodiment of the present invention, the third voltage V3 and the fourth voltage V4 may be at substantially the same level (e.g., 0V) as depicted in FIG. 3. However, in other embodiments, they can be at substantially different levels, as long as the logical levels of these two voltages are only set between the high level and the low level. Similarly, in the embodiment of the present invention, the seventh voltage V7 and the eighth voltage V8 may be at substantially the same level (e.g., 0V) as illustrated in FIG. 3. However, in other embodiments, they may also be at substantially different levels, as long as the logical levels of the seventh voltage V7 and the eighth voltage V8 are only set between the high level and the low level.

It should also be noted that in the embodiment of the present invention, the first time period t1 is substantially equal to the third time period t3, and the second time period t2 does not exceed 20% of the first time period t1. For instance, as illustrated in FIG. 3, both the first time period t1 and the third time period t3 span 5 units in time, while the second time period t2 is limited to 1 unit in time or less.

FIG. 4 illustrates a flowchart of a driving method for a cholesteric liquid crystal display, according to an embodiment of the present invention. As depicted in FIG. 4, the driving method for a cholesteric liquid crystal display, in this embodiment, consists of Steps 401 to 404. This driving method is applicable to the cholesteric liquid crystal display shown in FIG. 2. In Step 401, a first voltage and a second voltage are applied to the scan line and the data line, respectively, during the first time period. In Step 402, a third voltage and a fourth voltage are applied to the scan line and the data line, respectively, during the second time period. In Step 403, a fifth voltage and a sixth voltage are applied to the scan line and the data line, respectively, during the third time period. In this embodiment, the first voltage and the second voltage are set to a high level, while the sixth voltage and the fifth voltage are set to a low level. The levels of the third voltage and the fourth voltage are set between the high level and the low level.

Therefore, the present invention provides a driving method for the cholesteric liquid crystal display to increase the imaging stage period in the non-full-frame refresh mode. This allows the liquid crystal molecules to have sufficient time to obtain the energy required for rotation, thereby improving the chromatic aberration issue caused by both full-frame and non-full-frame refresh modes. As a result, viewers can enjoy a better visual experience.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A driving method for a cholesteric liquid crystal display, suitable for a cholesteric liquid crystal display comprising a scan line, a data line, and a pixel, comprising the steps:
    applying a first voltage to the data line and a second voltage to the scan line in a first time period, respectively;
    applying a third voltage to the data line and/or and a fourth voltage to the scan line in a second time period; and
    applying a fifth voltage to the data line and a sixth voltage to the scan line in a third time period;
    wherein the first time period is equal to the third time period, and the second time period is no more than 20% of the first time period, and the first voltage and the second voltage are set at a high level of voltage, while the sixth voltage and the fifth voltage are set at a low level of voltage, and the voltage levels of the third voltage and the fourth voltage are set between the high level of voltage of the first voltage and the second voltage and the low level of voltage of the sixth voltage and the fifth voltage, and the pixel is driven by voltage difference applied to the scan line and the data line, wherein the voltage difference equals an electric potential difference.

2. The driving method for a cholesteric liquid crystal display according to claim 1, wherein the third voltage is equal to the fourth voltage.

3. The driving method for a cholesteric liquid crystal display according to claim 1, wherein the third voltage is different from the fourth voltage.

4. A cholesteric liquid crystal display, comprising:
    a driving circuit;
    a scan line, electrically connected to the driving circuit;
    a data line, electrically connected to the driving circuit; and
    a pixel, electrically connected to both the scan line and the data line;
    wherein the driving circuit applying a first voltage to the data line and a second voltage to the scan line in a first time period; and applying a third voltage to the data line and a fourth voltage to the scan line in a second time period; and applying a fifth voltage to the data line and a sixth voltage to the scan line in a third time period, and the first time period is equal to the third time period, and the second time period is no more than 20% of the first time period, and the first voltage and the second voltage are set at a high level of voltage, while the sixth voltage and the fifth voltage are set at a low level of voltage, the voltage levels of the third voltage and the fourth voltage are set between the high level of voltage of the first voltage and the second voltage and the low level of voltage of the sixth voltage and the fifth voltage, and the pixels are driven by voltage difference applied to the scan line and the data line, wherein the voltage difference equals an electric potential difference.

5. The cholesteric liquid crystal display according to claim 4, wherein the third voltage is equal to the fourth voltage.

6. The cholesteric liquid crystal display according to claim 4, wherein the third voltage is different from the fourth voltage.

* * * * *